(12) United States Patent
Lee et al.

(10) Patent No.: US 7,851,523 B2
(45) Date of Patent: Dec. 14, 2010

(54) ASPHALT WATERPROOF COMPOSITION CONTAINING WASTE TIRE CHIPS AND BENTONITE AND PROCESS FOR ITS MANUFACTURE

(75) Inventors: Sang-Keun Lee, Gyeonggi-Do (KR); Jong-Yong Lee, Seoul (KR)

(73) Assignee: Re-New System Co., Ltd., Seoul (KR)

( * ) Notice: Subject to any disclaimer, the term of this patent is extended or adjusted under 35 U.S.C. 154(b) by 723 days.

(21) Appl. No.: 11/003,409

(22) Filed: Dec. 6, 2004

(65) Prior Publication Data

US 2006/0096503 A1    May 11, 2006

(30) Foreign Application Priority Data

Nov. 5, 2004 (KR) .................. 10-2004-0089792
Nov. 5, 2004 (KR) .................. 20-2004-0031327

(51) Int. Cl.
  *C08L 95/00* (2006.01)
(52) U.S. Cl. .................. 524/62; 524/68; 524/71
(58) Field of Classification Search ............ 524/62, 524/68, 71
  See application file for complete search history.

(56) References Cited

U.S. PATENT DOCUMENTS 5,811,477 A * 9/1998 Burris et al. .................. 524/60
6,706,787 B1 * 3/2004 Burris et al. .................. 524/60

* cited by examiner

*Primary Examiner*—Peter Szekely
(74) *Attorney, Agent, or Firm*—Birch, Stewart, Kolasch & Birch, LLP

(57) ABSTRACT

An asphalt waterproof composition containing waste tire chips and bentonite which includes about 10-15 of asphalt, about 20-50 of oil, about 8-12 of filler, about 1-3.5 of elasticity increasing agent, about 25-40 of waste tire chips melting solution, about 0.5-1 of sulfur, about 0.05-1 of sulfur vulcanizing agent, about 0.1-0.4 of antiaging agent, about 10-20 of bentonite, about 1-5 of water soluble high polymer resin by weight, respectively, and the process for the preparation of its manufacture.

15 Claims, No Drawings

ASPHALT WATERPROOF COMPOSITION CONTAINING WASTE TIRE CHIPS AND BENTONITE AND PROCESS FOR ITS MANUFACTURE

CROSS-REFERENCE TO RELATED APPLICATIONS

The present invention claims the priority benefit, under 35 U.S.C. §119, of Korean Application No. 10-2004-0089792 filed Nov. 5, 2004 and Korean Application No. 20-2004-0031327 filed Nov. 5, 2004, the entirety of which is incorporated herein by reference.

BACKGROUND OF THE INVENTION

1. Field of the Invention

The present invention relates to an asphalt waterproof composition containing waste tire chips and bentonite, and process for its manufacture. More particularly, the present invention relates to an improved asphalt waterproof composition and a method for obtaining such comprising the steps of providing jelly asphalt, heating and mixing the jelly asphalt and waste tire chips, and adding bentonite to the mixture. The asphalt waterproof composition has high elastic cohesive power.

2. Description of Background Art

Various types of asphalt compositions and its methods of manufacture are known in the art. Generally, nowadays, conventional asphalt compositions combine asphalt with elastic rubber to solve a number of problems such as weakness in elasticity, shock and crack of such conventional asphalts. However, separating from the floor, ease of cracking, and easy loss of waterproofing ability, remain as unsolved problems for conventional asphalts easily.

In order to solve such problems, a conventional asphalt composition includes bentonite as an asphalt modifier. Bentonite as a soft, porous and moisture absorbing clay. Bentonite may have high swelling capacity in water or negligible swelling capacity. Bentonite forms colloidal suspensions in water with strongly thixotropic properties. In such a conventional asphalt composition, the role of bentonite is to provide a certain workability for making a construction of asphalt on the floor.

However, such a conventional asphalt composition containing bentonite suffers from a number of problems. For example, the porous bentonite maintains a certain degree of non-swelling properties with a certain non-hydrophilic fluid. Thus, the non-hydrophilic fluid cannot prevent, or has a weak ability to preserve the bentonite, and the bentonite consequently swells and is continuously washed away by water after construction of such a conventional asphalt composition. Thus, when the bentonite makes contacts with a large amount of water, the conventional asphalt composition will not seal in certain spaces. Therefore, the waterproofing power of such a conventional asphalt composition is reduced and the user cannot obtain the desired waterproofing ability.

In addition, such a conventional asphalt composition containing bentonite is usually combined with polybutene and butylrubber. However, when the conventional asphalt composition is going to dry for a long time, polybutene and butylrubber cause a reduction in the degree of swelling of the bentonite. Therefore, the constructed asphalt composition may be easily cracked. Also, bentonite is very expensive for using in large amounts.

SUMMARY OF THE INVENTION

Accordingly, it is an object of the present invention to provide an asphalt waterproof composition containing waste tire chips and bentonite, and a process for its manufacture, which eliminates the above problems encountered with conventional asphalt compositions.

Another object of the present invention is to provide an improved asphalt composition and method for its manufacture for improving the waterproofing ability and elasticity thereof and preventing from weaknesses due to shock, cracking and curling thereof by using a certain amount of waste tire chips and bentonite to asphalt base.

A further object of the present invention is to provide an improved asphalt waterproof composition including styrenebutadiene rubber extracted from waste tire chips melting solution, combined with bentonite and asphalt by bridging structure of rubber, so that the present asphalt composition has a high degree of waterproofing ability and a high degree of bentonite loss prevention.

Still another object of the present invention is to provide an asphalt composition for self-repairing. For instance, such self-repair may be necessitated by metal wires, concrete chips, earth and sand, pipes, etc, piercing through the waterproof layer thereof. Self-repair may also be necessitated by curled portions coming undone from the floor by the swelling power from the hydrophilic reaction of bentonite and the hydrophilic reaction from the polymer resin thereof.

Yet another object of the present invention is to provide a process for the preparation of asphalt composition containing waste tire chips and bentonite which comprises the steps of mixing and heating asphalt, oil, filler and surface-active agent at a temperature of about 150°-180° C. to produce a jelly asphalt, mixing the jelly asphalt with melting solution of waste tire chips, sulfur, sulfur vulcanizing agent, rubber anti-aging agent at a temperature of about 150°-180° C. to produce a waste tire chips melting mixture asphalt waterproof solution, and agitating the waste tire chips melting mixture asphalt waterproof solution with bentonite and water soluble polymer resin.

A further object of the present invention is to provide a process for manufacturing an asphalt waterproof composition containing waste tire chips and bentonite which comprises the steps of mixing and heating together about 10-15 of asphalt, about 20-50 of oil, about 8-12 of filler, about 1-3.5 of elasticity increasing agent, and about 0.1-0.5 of surface-active agent in percent by weight, respectively, at a temperature of about 150°-180° C. to form a jelly asphalt, mixing the jelly asphalt with about 25-40 of waste tire chips melting solution, about 0.5-1 of sulfur, about 0.05-1 of sulfur vulcanizing agent, and 0.1-0.4 of rubber antiaging agent in percent by weight, respectively, at a temperature of about 150°-180° C. to form a waste tire melting asphalt solution, and mixing and agitating the waste tire melting asphalt solution with about 10-20 of bentonite and about 1-5 of water soluble polymer resin in percent by weight, respectively.

Other objects and further scope of applicability of the present invention will become apparent from the detailed description given hereinafter. It should be understood, however, that the detailed description and specific example, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

For the purpose of preferred embodiments of the present invention are disclosed wherein the asphalt waterproof composition containing waste tire chips and bentonite includes about 10-15 of asphalt, about 20-50 of oil, about 8-12 of filler, about 1-3.5 of elasticity increasing agent, about 25-40 of waste tire chips melting solution, about 0.5-1 of sulfur, about 0.05-1 of sulfur vulcanizing agent, about 0.1-0.4 of rubber antiaging agent, about 10-20 of bentonite, about 1-5 of water soluble polymer resin in percent by weight, respectively, and the process for the preparation thereof.

The process for the preparation of the asphalt waterproof composition containing waste tire chips and bentonite comprises three steps as follows: That is, three steps include (1) mixing and heating asphalt, oil, filler and surface-active agent at a temperature of about 150°-180° C. to produce a jelly asphalt; (2) mixing the jelly asphalt with melting solution of waste tire chips, sulfur, sulfur vulcanizing agent, rubber anti-aging agent at a temperature of about 150°-180° C. to produce a waste tire melting mixture asphalt waterproof solution; and (3) agitating the waste tire chips melting mixture waterproof solution with bentonite and water soluble polymer resin.

In the first step, various types of asphalts such as straight asphalt, blown asphalt, natural asphalt, asphalt compound and cut-back asphalt, preferably straight asphalt, blown asphalt and cut-back asphalt may be used.

At this time, the oil which combines with the asphalt is usually mineral oil, animal and vegetable oil, and synthetic oil. In the above oils, it is preferably mineral sprit oil and hydrocarbon oils such as aromatic oil, naphthane oil and paraffin oil. Also, other oils such as aliphatic metal salts of calcium rosinate, sodium rosinate and sodium oleinate, glycols of ethyleneglycol, propyleneglycol and glycerin, and Vaseline can be used. Sometimes, waste oils of the above oils can be used.

Particularly, in the first step of the process for the preparation according to the present invention, the preferable heating temperature is about 160-170° C. and the preferable weight ratio is about 12-13 of asphalt, about 30-40 of oil, about 6-10 of filler, about 2-2.5 of elasticity increasing agent, about 0.2-0.3 of surface-active agent in percent by weight, respectively.

In second step of the process for the preparation of asphalt waterproof composition containing waste tire chips and bentonite, the waste tire chips melting solution is pyrolyzed by heat alone at a temperature about 150°-180° C. to extract styrenebutadiene rubber having carbon black. The waste tire chips melting solution contains blocking material which can cut off internal oxidation and ultraviolet rays, so that the jelly asphalt combined with waste tire chips melting solution possesses durability. The waste tire chips melting solution is produced by heating waste tire chips and lubricating oil in a reactor at a temperature of about 200°-500° C., preferably 310° C.

Also, in second step of the process of the present invention, about 0.5-1 by weight of sulfur may be added to the jelly asphalt produced from the above first step. At this time, sulfur vulcanizing agent is zinc oxide, stearic acid and oleic acid, and rubber antiaging agent is amines and phenols for improving heat-resistant and weather-resistant of the final product of the present invention.

Particularly, in the second step of the process for the preparation according to the present invention, the preferable weight ratio is about 30-35 of waste tire melting solution, about 0.7-0.8 of sulfur, about 0.07-0.8 of sulfur vulcanizing agent, about 0.2-0.3 of antiaging agent in percent by weight, respectively.

In the third step of the process for the preparation of asphalt waterproof composition containing waste tire chips and bentonite, the copolymer resin is a kind of water soluble resin which forms an elastic water-resistant membrane after reacting with water. The polymer resin is sodium acrylate gel, sodium polyacrylate, polyvinylalcohol as a super absorbent polymer (SAP), and polyacrylamides, and polyacrylesters as a water soluble polymer aggregate. At this time, the polymer resin can be preferably used the above two resins selected from one of the hydrophilic polymer (SAP) and one of the water soluble polymer aggregate. Also, the above polymer aggregate can be used with positive ions, negative ions and nonions.

Bentonite in the third step of the present invention is sodium bentonite which has a high swelling capacity in water. That is, the bentonite having about 4-9 mm of the thickness of layer thereof and $1\times10-8-1\times10^{-12}$ cm/sec of the special coefficient can swell 13-16 times in volume after reacting with water. After drying, the bentonite returns to the origin volume. The bentonite can continuously operate the swelling and collapsing movement. In the third step of the process for the preparation according to the present invention the preferable weight ratio is about 13-17 of bentonite and about 2-4 of water soluble polymer resin in percent by weight, respectively.

In order to control the swelling speed, to the asphalt waterproof composition produced from the third step according to the present invention can be added about 1-5 percent by weight water soluble polymer resin again to produce a product if needed. Thereafter, about 0.1-0.4 percent by weight of rubber antiaging agent and 0.1-0.4 of rubber stabilizer percent by weight, respectively can be added to the above product if needed. Also, after the third step of the present invention, about 0.1-1 percent by weight of elastic and swelling speed controlling agent by weight can be added to the asphalt waterproof composition.

Accordingly, the asphalt waterproof composition containing waste tire chips and bentonite provides many of advantages as follows. For example, the asphalt waterproof composition has an excellent waterproofing ability compared with conventional asphalt, urethanes and epoxy resins since the asphalt combined with the waste tire melting solution and bentonite of the present invention produces a highly elastic jelly product. The final product has high cohesive power and does not harden after applying to the floor due to oil when compared with the conventional asphalt which is hardened after application to the floor. If the constructed present asphalt composition is cracked, separates from the floor and is pierced by nails, the damage can be immediately remedied by the repeated swelling and drying operation of the bentonite and water soluble polymer resin.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A process for the preparation of asphalt waterproof composition containing waste tire chips and bentonite, the process for the preparation of asphalt waterproof composition comprising the steps of:
  (1) mixing and heating about 10-15 of asphalt, about 20-50 of oil, about 8-12 of filler, about 1-3.5 of rubber and about 0.1-0.5 of surface-active agents, in percent by weight, respectively at a temperature of about 150°-180° C. to produce a jelly asphalt;
  (2) mixing and heating the jelly asphalt with about 25-40 of liquefied waste tire chips, about 0.5-1 of sulfur, about 0.05-1 of sulfur vulcanizing agent selected from zinc oxide, stearic acid or oleic acid and about 0.1-0.4 of rubber antiaging agent selected from hindered amines or hindered phenols, in percent by weight, respectively at a temperature of about 150°-180° C. to produce a melting mixture solution; and
  (3) mixing and agitating the melting mixture solution with about 10-20 of bentonite and about 1-5 of water soluble polymer resin, in percent by weight, respectively,
  wherein the liquefied waste tire chips are prepared by a method comprising pyrolyzing tire chips.

2. The process for the preparation of the asphalt waterproof composition of claim 1, said process comprising the steps of:
  (1) mixing and heating about 12-13 of asphalt, about 30-40 of oil, about 6-10 of filler, about 2-2.5 of rubber and about 0.2-0.3 of surface-active agent, in percent by weight, respectively at a temperature of about 160°-170° C. to produce the jelly asphalt;
  (2) mixing and heating the jelly asphalt with about 30-35 of liquefied waste tire chips, about 0.7-0.8 of sulfur, about 0.07-0.8 of sulfur vulcanizing agent and about 0.2-0.3 of rubber antiaging agent, in percent by weight, respectively at a temperature of about 160°-170° C. to produce the melting solution; and
  (3) mixing and agitating the melting solution with about 13-17 of bentonite and about 2-4 of water soluble polymer resin percent by weight, respectively.

3. The process for the preparation of the asphalt waterproof composition of claim 1, wherein the liquefied waste tire chips are prepared by pyrolyzing tire chips at a temperature of about 200°-500° C.

4. The process for the preparation of the asphalt waterproof composition of claim 1, wherein the process further comprises adding about 1-5 percent by weight of water soluble polymer resin to the product of step (3) for controlling the elastic speed and swelling speed thereof.

5. The process for the preparation of the asphalt waterproof composition of claim 1, wherein the process further comprises adding about 0.1-0.4 percent by weight of rubber antiaging agent to the product of step (3) for increasing the expected life span thereof.

6. The process for the preparation of the asphalt waterproof composition of claim 4, wherein the process further comprises adding about 0.1-1 percent by weight of elastic and swelling speed controlling agent to the product of step (3).

7. The process for the preparation of the asphalt waterproof composition of claim 1, wherein the asphalt is chemical selected from the group consisting of straight asphalt, blown asphalt, natural asphalt, asphalt compound and cut-back asphalt.

8. The process for the preparation of the asphalt waterproof composition of claim 1, wherein the oil is chemical selected from the group consisting of mineral oil, animal oil, vegetable oil, synthetic oil, glycols, and waste oils.

9. The process for the preparation of the asphalt waterproof composition of claim 1, wherein the bentonite is sodium bentonite.

10. The process for the preparation of the asphalt waterproof composition of claim 9, wherein the bentonite has about 4-9 mm of the thickness of the layer thereof and $1\times10^{-8}$ to $1\times10^{-12}$ cm/sec of the special coefficient for being swelled 13-16 times volume after reacting with water, and thereafter drying, the bentonite comes back to the original volume.

11. An asphalt waterproof composition containing waste tire chips and bentonite, the asphalt waterproof composition comprising:
  about 10-15 of asphalt, about 20-50 of oil, about 8-12 of filler, about 1-3.5 of rubber, about 0.1-0.5 of surface-active agent, about 25-40 of liquefied waste tire chips, about 0.5-1 of sulfur, about 0.05-1 of sulfur vulcanizing agent selected from zinc oxide, stearic acid or oleic acid, about 0.1-0.4 of antiaging agent selected from hindered amines or hindered phenols, about 10-20 of bentonite and about 1-5 of water soluble polymer resin, in percent by weight, respectively, wherein the liquefied waste tire chips are prepared by pyrolyzing tire chips.

12. The asphalt waterproof composition of claim 11, wherein the asphalt waterproof composition comprises:
  about 12-13 of asphalt, about 30-40 of oil, about 6-10 of filler, about 2-2.5 of rubber, about 0.2-0.3 of surface-active agent, about 30-35 of liquefied waste tire chips, about 0.7-0.8 of sulfur, about 0.07-0.8 of sulfur vulcanizing agent, about 0.2-0.3 of antiaging agent, about 13-17 of bentonite, and about 2-4 of water soluble polymer resin, in percent by weight, respectively.

13. The asphalt waterproof composition of claim 11, wherein the bentonite is sodium bentonite.

14. The process for the preparation of the asphalt waterproof composition of claim 1, wherein the water soluble polymer resin is at least one selected from the group consisting of sodium acrylate gel, sodium polyacrylate, polyvinylalcohol, polyacrylamide and polyacrylester.

15. The asphalt waterproof composition of claim 11, wherein the water soluble polymer resin is at least one selected from the group consisting of sodium acrylate gel, sodium polyacrylate, polyvinylalcohol, polyacrylamide and polyacrylester.

* * * * *